(12) United States Patent  
Morita

(10) Patent No.: US 8,813,250 B2  
(45) Date of Patent: Aug. 19, 2014

(54) ACCESS CONTROL PROGRAM, SYSTEM, AND METHOD

(75) Inventor: Yoichiro Morita, Tokyo (JP)

(73) Assignee: NEC Corporation, Tokyo (JP)

( * ) Notice: Subject to any disclaimer, the term of this patent is extended or adjusted under 35 U.S.C. 154(b) by 132 days.

(21) Appl. No.: 13/638,539

(22) PCT Filed: Mar. 11, 2011

(86) PCT No.: PCT/JP2011/056498  
§ 371 (c)(1),  
(2), (4) Date: Sep. 28, 2012

(87) PCT Pub. No.: WO2011/122366  
PCT Pub. Date: Oct. 6, 2011

(65) Prior Publication Data  
US 2013/0024909 A1      Jan. 24, 2013

(30) Foreign Application Priority Data

Mar. 31, 2010   (JP) ................................ 2010-080187

(51) Int. Cl.  
*G06F 7/04*      (2006.01)  
*G06F 17/30*     (2006.01)  
*H04N 7/16*      (2011.01)

(52) U.S. Cl.  
USPC ............. 726/28; 726/1; 726/2; 726/3; 726/27

(58) Field of Classification Search  
CPC ..... H04L 63/10; H04L 63/101; H04L 63/104; H04L 63/105; G06F 21/62; G06F 21/6209; G06F 21/6218

USPC ........................ 726/2–4, 21, 27–30  
See application file for complete search history.

(56) References Cited

U.S. PATENT DOCUMENTS

2007/0226808 A1     9/2007   Uchikawa

FOREIGN PATENT DOCUMENTS

| JP | 11-313102 A | 11/1999 |
| JP | 2007-257529 A | 10/2007 |
| JP | 2009-110099 A | 5/2009 |

*Primary Examiner* — Eleni Shiferaw  
*Assistant Examiner* — Jing Sims  
(74) *Attorney, Agent, or Firm* — Sughrue Mion, PLLC

(57) ABSTRACT

Authority permission grants/denials associated with each of a plurality of roles (R1, R2, . . . , Rm) assigned to one subject are derived by inheritance based on a subject assignment associating a role and a subject, an authority permission assignment associating a role, an authority permission, and a grant/denial, and a role hierarchy indicating an inheritance relation between roles. Among the derived authority permission grants/denials, grants/denials of authority permissions (A1, A2, . . . , An) which are each derived from two or more different roles (R1, R2, . . . , Rm) and which are each granted to one of the plurality of roles R1, R2 . . . Rm but denied to another one of the plurality of roles R1, R2 . . . Rm are determined in accordance with an input. As exceptional authority permission assignment for a virtual exceptional role constituted of a combination of roles (R1, R2, . . . , Rm), authority permission grants/denials associated with each role (R1, R2, . . . , Rm) are derived by inheritance based on the role hierarchy, authority permission assignment, and the exceptional authority permission assignment.

5 Claims, 8 Drawing Sheets

| ROLE LIST | SUBJECT |
|---|---|
| GENERAL AFFAIRS DIVISION | k-satou<br>m-suzuki |
| ACCOUNTING DIVISION | t-takahashi<br>t-tanaka |
| ACCOUNTING DIVISION,<br>GENERAL AFFAIRS DIVISION | h-watanabe<br>n-itou |
| SECRETARY DEPARTMENT | m-yamamoto |
| PUBLIC RELATIONS DEPARTMENT | h-nakamura |

FIG. 4

| ROLE | DIRECT INHERITANCE SOURCE ROLE |
|---|---|
| A CORPORATION | |
| GENERAL AFFAIRS DIVISION | A CORPORATION |
| ACCOUNTING DIVISION | A CORPORATION |
| SECRETARY DEPARTMENT | GENERAL AFFAIRS DIVISION |
| PUBLIC RELATIONS DEPARTMENT | GENERAL AFFAIRS DIVISION |

FIG. 5

| ROLE | AUTHORITY PERMISSION | GRANT/DENIAL |
|---|---|---|
| A CORPORATION | kaishafile1, read | permit |
| | kaishafile1, write | deny |
| | kaishafile2, read | permit |
| | kaishafile2, write | deny |
| GENERAL AFFAIRS DIVISION | kaishafile1, write | permit |
| | soumufile1, read | permit |
| | soumufile1, write | permit |
| | kaikeifile1, read | deny |
| | kaikeifile1, write | deny |
| | manual1, read | permit |
| | manual1, write | permit |
| ACCOUNTING DIVISION | kaishafile1, write | permit |
| | keirifile1, read | permit |
| | keirifile1, write | permit |
| | kaikeifile1, read | permit |
| | kaikeifile1, write | permit |
| | manual1, read | permit |
| | manual1, write | deny |
| SECRETARY DEPARTMENT | hishofile1, read | permit |
| | hishofile1, write | permit |
| PUBLIC RELATIONS DEPARTMENT | kaishafile2, write | permit |
| | kouhoufile1, read | permit |
| | kouhoufile1, write | permit |

FIG. 6

| ROLE | AUTHORITY PERMISSION | GRANT/DENIAL |
|---|---|---|
| GENERAL AFFAIRS DIVISION | kaishafile1, read | permit |
| | kaishafile1, write | permit |
| | kaishafile2, read | permit |
| | kaishafile2, write | deny |
| | soumufile1, read | permit |
| | soumufile1, write | permit |
| | kaikeifile1, read | deny |
| | kaikeifile1, write | deny |
| | manual1, read | permit |
| | manual1, write | permit |
| ACCOUNTING DIVISION | kaishafile1, read | permit |
| | kaishafile1, write | permit |
| | kaishafile2, read | permit |
| | kaishafile2, write | deny |
| | keirifile1, read | permit |
| | keirifile1, write | permit |
| | kaikeifile1, read | permit |
| | kaikeifile1, write | permit |
| | manual1, read | permit |
| | manual1, write | deny |

FIG. 7

| ROLE LIST | AUTHORITY PERMISSION |
|---|---|
| ACCOUNTING DIVISION, GENERAL AFFAIRS DIVISION | kaikeifile1, read |
| | kaikeifile1, write |
| | manual1, write |

FIG. 8

| EXCEPTIONAL AUTHORITY PERMISSION ASSIGNMENT EDITING |
| --- |
| ROLE LIST WHERE CONFLICT HAS OCCURRED |
| (ACCOUNTING DIVISION, GENERAL AFFAIRS DIVISION) |

CONFLICTING AUTHORITY PERMISSIONS

| OBJECT | ACTION | |
| --- | --- | --- |
| kaikeifile1: GENERAL AFFAIRS ACCOUNTING REPORT FILE | ☑ READ | ☐ WRITE |
| manual1: ACCOUNTING SYSTEM USER MANUAL FILE | ☑ WRITE | |

[RESET]  [SAVE]

FIG. 10

| ROLE LIST | AUTHORITY PERMISSION | GRANT/DENIAL |
|---|---|---|
| ACCOUNTING DIVISION, GENERAL AFFAIRS DIVISION | kaikeifile1, read | permit |
| | kaikeifile1, write | deny |
| | manual1, write | permit |

FIG. 11

| ROLE | AUTHORITY PERMISSION | GRANT/DENIAL |
|---|---|---|
| GENERAL AFFAIRS DIVISION | kaishafile1, read | permit |
| | kaishafile1, write | permit |
| | kaishafile2, read | permit |
| | kaishafile2, write | deny |
| | soumufile1, read | permit |
| | soumufile1, write | permit |
| | kaikeifile1, read | permit |
| | kaikeifile1, write | deny |
| | manual1, read | permit |
| | manual1, write | permit |
| ACCOUNTING DIVISION | kaishafile1, read | permit |
| | kaishafile1, write | permit |
| | kaishafile2, read | permit |
| | kaishafile2, write | deny |
| | keirifile1, read | permit |
| | keirifile1, write | permit |
| | kaikeifile1, read | permit |
| | kaikeifile1, write | deny |
| | manual1, read | permit |
| | manual1, write | permit |

ACCESS CONTROL PROGRAM, SYSTEM, AND METHOD

TECHNICAL FIELD

This invention relates to access control for computer security, and more particularly, to role-based access control (RBAC).

BACKGROUND ART

Role-based access control generally uses the concept of roles in the writing up of a management policy. A role indicates what part is to be played, and a set of authority permissions necessary to play the part is grouped as a role. A subject is assigned a role instead of individual authority permissions. This eliminates the need for a rule maker to write a large number of access control rules which define actions for each subject and each object, and lessens the burden of making access control rules.

FIG. 1 and FIG. 19 of Japanese Unexamined Patent Application Publication (JP-A) No. 11-313102 (hereinafter, referred to as Patent Literature 1) are given as a document that describes a technology related to this invention. An access control method described in the document is a method of generating an access control list that is written as a combination of an accessor and an access target, from an access control policy that is written as a combination of an accessor type, an access target type, and a constraint condition based on an organization structure. This access control method includes subject type group information, which directly associates a subject (accessor) and a subject type, object type group information, which directly associates an object (access target) and an object type, and organization structure information, which expresses the association of the subject and the object with an organization in a single tree structure, and the method uses these to generate only an access control list where the constraint condition is satisfied.

DISCLOSURE OF THE INVENTION

Problem to be Solved by the Invention

In the case where there are such roles as an organization structure and a project and there are users who, as subjects, are assigned roles in different combinations or in different orders, defining the relation between a role and authority permission grants/denials conventionally requires newly writing all authority permissions for each user.

The access control method described in Patent Literature 1 also does not include a method of determining how an access control rule should be generated for a subject who is assigned a plurality of arbitrary roles (subject types) concurrently from a role hierarchy that has a plurality of independent tree structures, when authority permissions grouped for one of the roles conflict with authority permissions grouped for another of the roles. Consequently, access control specifics cannot be written for a subject who concurrently plays a plurality of arbitrary roles assigned from a role hierarchy that has a plurality of independent tree structures.

This invention has been made in view of the above-mentioned situation, and an object of this invention is to provide an access control method, an access control system, and an access control program which are capable of resolving a conflict when a subject concurrently plays a plurality of arbitrary roles assigned from a role hierarchy that has a plurality of independent tree structures, such as organization structures, and an access right grant/denial derived for one of the roles that the subject concurrently plays conflicts with an access right grant/denial derived for another of the roles.

Means to Solve the Problem

In order to attain the object described above, this invention provides the following access control program, system, and method:

According to one aspect of this invention, there is provided an access control program for controlling a computer to execute: a step of storing a subject assignment, an authority permission assignment, and a role hierarchy together or separately in one or more storage devices, the subject assignment associating one or more roles and a subject to which the one or more roles are assigned, the authority permission assignment associating a role, an authority permission, and a grant/denial which indicates whether a subject assigned the role is granted or denied the authority permission, the role hierarchy indicating an inheritance relation between roles; a step of determining whether or not one subject is assigned a plurality of roles in the subject assignment and, when it is determined that one subject is assigned a plurality of roles, obtaining the plurality of roles, R1, R2 ... Rm (m is a natural number equal to or larger than 2); a first authority permission grant/denial deriving step of deriving, by inheritance, authority permission grants/denials associated with each of the plurality of roles R1, R2 ... Rm, based on the role hierarchy and the authority permission assignment; a step of storing, among the authority permission grants/denials derived by inheritance, authority permissions A1, A2 ... An (n is a natural number) which are each derived from two or more different roles out of the plurality of roles R1, R2 ... Rm and which are each granted to one of the plurality of roles R1, R2 ... Rm but denied to another of the plurality of roles R1, R2 ... Rm, in one of the one or more storage devices as authority permissions that are conflicting among a combination of the plurality of roles R1, R2 ... Rm; a step of receiving via an input device grants/denials of the authority permissions A1, A2 ... An for the one subject assigned the combination of the plurality of roles R1, R2 ... Rm; a step of storing, based on the received grants/denials, grants/denials of the authority permissions A1, A2 ... An with respect to the combination of the plurality of roles R1, R2 ... Rm in one of the one or more storage devices as an exceptional authority permission assignment for an exceptional role, which is a virtual role constituted of the combination of the plurality of roles R1, R2 ... Rm; and a second authority permission grant/denial deriving step of deriving, by inheritance, authority permission grants/denials associated with each of the plurality of roles R1, R2 ... Rm of the exceptional role, based on the role hierarchy, the authority permission assignment, and the exceptional authority permission assignment.

According to another aspect of this invention, there is provided an access control system, including: one or more storage devices for storing a subject assignment associating one or more roles and a subject to which the one or more roles are assigned, an authority permission assignment associating a role, an authority permission, and a grant/denial which indicates whether a subject assigned the role is granted or denied the authority permission, a role hierarchy indicating an inheritance relation between roles; a processing device for determining whether or not one subject is assigned a plurality of roles in the subject assignment and, when it is determined that one subject is assigned a plurality of roles, obtaining the plurality of roles, R1, R2 ... Rm (m is a natural number equal to or larger than 2); a first authority permission grant/denial deriving processing device for deriving, by inheritance, authority permission grants/denials associated with each of the plurality of roles R1, R2 . . . Rm, based on the role hierarchy and the authority permission assignment; a processing device for storing, among the authority permission grants/denials derived by inheritance, authority permissions A1, A2 . . . An (n is a natural number) which are each derived from two or more different roles out of the plurality of roles R1, R2 . . . Rm and which are each granted to one of the plurality of roles R1, R2 . . . Rm but denied to another of the plurality of roles R1, R2 . . . Rm, in one of the one or more storage devices as authority permissions that are conflicting among a combination of the plurality of roles R1, R2 . . . Rm; a processing device for receiving via an input device grants/denials of the authority permissions A1, A2 . . . An for the one subject assigned the combination of the roles R1, R2 . . . Rm; a processing device for storing, based on the received grants/denials, grants/denials of the authority permissions A1, A2 . . . An with respect to the combination of the plurality of roles R1, R2 . . . Rm in one of the one or more storage devices as an exceptional authority permission assignment for an exceptional role, which is a virtual role constituted of the combination of the plurality of roles R1, R2 . . . Rm; and a second authority permission grant/denial deriving processing device for deriving, by inheritance, authority permission grants/denials associated with each of the plurality of roles R1, R2 . . . Rm of the exceptional role, based on the role hierarchy, the authority permission assignment, and the exceptional authority permission assignment.

According to still another aspect of this invention, there is provided an access control method including: a stage of executing, by a computer, a step of storing a subject assignment, an authority permission assignment, and a role hierarchy together or separately in one or more storage devices, the subject assignment associating one or more roles and a subject to which the one or more roles are assigned, the authority permission assignment associating a role, an authority permission, and a grant/denial which indicates whether a subject assigned the role is granted or denied the authority permission, the role hierarchy indicating an inheritance relation between roles; a stage of executing, by the computer, a step of determining whether or not one subject is assigned a plurality of roles in the subject assignment and, when it is determined that one subject is assigned a plurality of roles, obtaining the plurality of roles, R1, R2 . . . Rm (m is a natural number equal to or larger than 2); a first authority permission grant/denial deriving stage of executing, by the computer, a step of deriving, by inheritance, authority permission grants/denials associated with each of the plurality of roles R1, R2 . . . Rm, based on the role hierarchy and the authority permission assignment; a stage of executing, by the computer, a step of storing, among the authority permission grants/denials derived by inheritance, authority permissions A1, A2 . . . An (n is a natural number) which are each derived from two or more different roles out of the plurality of roles R1, R2 . . . Rm and which are each granted to one of the plurality of roles R1, R2 . . . Rm but denied to another of the plurality of roles R1, R2 . . . Rm, in one of the one or more storage devices as authority permissions that are conflicting among a combination of the plurality of roles R1, R2 . . . Rm; a stage of executing, by the computer, a step of receiving via an input device grants/denials of the authority permissions A1, A2 . . . An for the one subject assigned the combination of the plurality of roles R1, R2 . . . Rm; a stage of executing, by the computer, a step of storing, based on the received grants/denials, grants/denials of the authority permissions A1, A2 . . . An with respect to the combination of the plurality of roles R1, R2 . . . Rm in one of the one or more storage devices as an exceptional authority permission assignment for an exceptional role, which is a virtual role constituted of the combination of the plurality of roles R1, R2 . . . Rm; and a second authority permission grant/denial deriving stage of executing, by the computer, a step of deriving, by inheritance, authority permission grants/denials associated with each of the plurality of roles R1, R2 . . . Rm of the exceptional role, based on the role hierarchy, the authority permission assignment, and the exceptional authority permission assignment.

Effect of the Invention

According to this invention, merely by writing authority permissions for each role as in the conventional way, a conflict of authority permission grants/denials between roles is detected that can occur when one subject is assigned a plurality of roles, and the conflict is resolved by generating, in accordance with a user input, an exceptional authority permission assignment which defines conflicting authority permission grants/denials as an exception.

This invention thus makes it unnecessary to newly write all authority permissions for each user in defining the relation between a role and authority permission grants/denials when there are such roles as an organization structure and a project and there are users who, as subjects, are assigned roles in different combinations or in different orders.

In addition, when there are users who are assigned roles in different combinations or in different orders, this invention merely requires writing the relation between a role and authority permission grants/denials with the same method and system as conventional ones in defining the relation between a role and authority permission grants/denials, without newly writing all authority permissions for each user, to define an exceptional relation between a role and authority permission grants/denials for only a combination of a subject and authority permissions that needs an exceptional definition, and to thereby resolve a conflict.

BRIEF DESCRIPTION OF THE DRAWING

FIG. 4 is an example of a subject assignment stored by a subject assignment storing unit 2.

FIG. 5 is an example of a role hierarchy stored by a role hierarchy storing unit 1.

FIG. 6 is an example of an authority permission assignment stored by an authority permission assignment storing unit 3.

FIG. 7 is an example of authority permission grants/denials after role inheritance processing which are generated by the conflict detecting unit 5.

FIG. 8 is an example of information indicating a conflict which is generated by the conflict detecting unit 5.

FIG. 10 is an example of a user interface for editing an exceptional authority permission assignment which is generated by the exceptional authority permission assignment editing unit 6.

FIG. 11 is an example of an exceptional authority permission assignment which is generated by the exceptional authority permission assignment editing unit 6.

FIG. 12 is another example of authority permission grants/denials after role inheritance processing which are generated by the conflict detecting unit 5.

BEST MODE FOR EMBODYING THE INVENTION

Explanation of Terms

Figure 1:
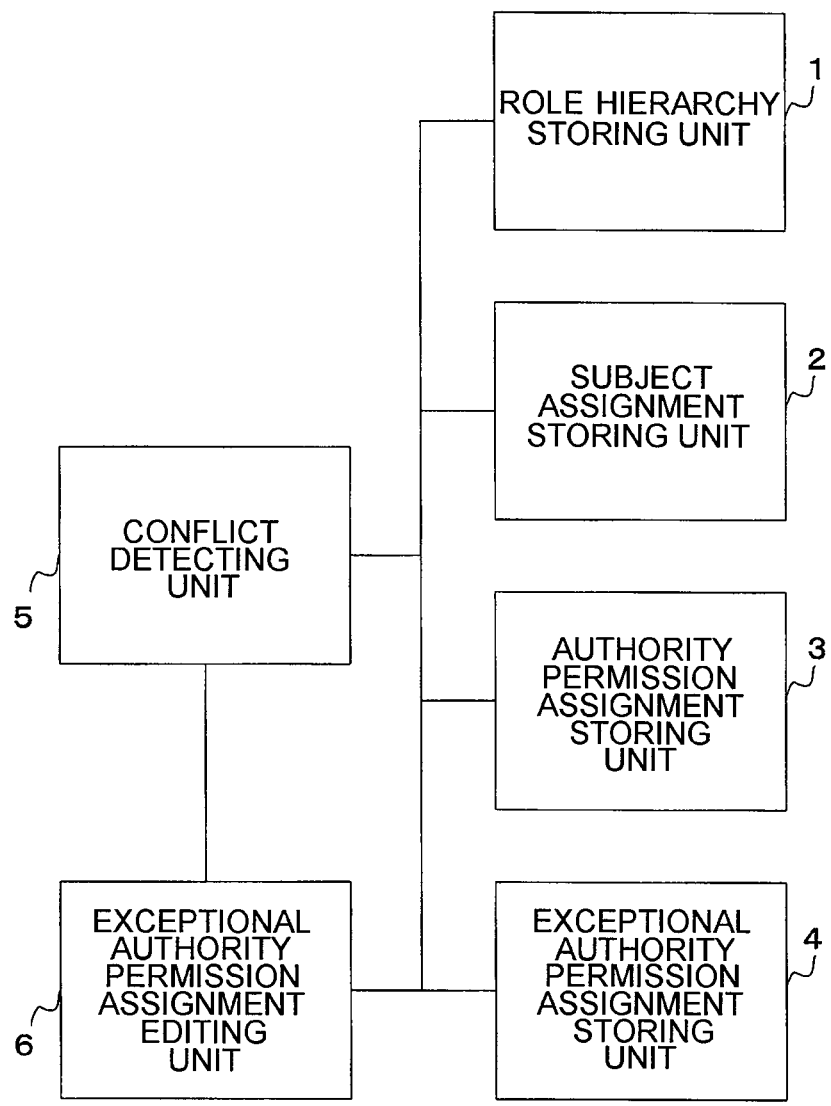
FIG. 1 is a system configuration diagram of an access control system 100 which is an embodiment mode of this invention.

Before a description is given on an embodiment mode of this invention, terms used in the description are explained.

"Access right" means a combination of a specific subject (s), an object (o), and an action (a). "Access right grant/denial" means a combination of a specific access right and an identifier that indicates a grant or denial of the access right.

"Authority permission" means a combination of a specific object (o) and an action (a). "Authority permission grant/denial" means a combination of a specific authority permission and an identifier that indicates a grant or denial of the authority permission.

"Role" is an identifier given to a set of authority permission grants/denials. The name of an assigned department, a post, an assigned project, task specifics, a work item, or the like is generally used as a role. Each subject has 0 or more roles. A subject who does not have a role (who has 0 roles) generally has no authority permissions.

"Subject Assignment" is a definition of an assignment of a subject to a role. A subject assignment is written in the form of a combination of a role list and a subject. When a subject has a plurality of roles, there is generally a rank order among the roles, such as a main role and a subsidiary role. Even subjects who have the same combination of roles are assigned different sets of authority permission grants/denials from each other if the rank order among roles differs from one subject to another. For example, in the case where there are roles "general affairs division" and "accounting division", and when Subject A has "general affairs division" as a main role and "accounting division" as a subsidiary role, and Subject B has "accounting division" as a main role and "general affairs division" as a subsidiary role, there are differences such as one in which, if authority permission grants/denials of "general affairs division" and "accounting division" conflict, Subject A conforms to the authority permission grant/denial of "general affairs division" whereas Subject B conforms to the authority permission grant/denial of "accounting division". Accordingly, the definition of the assignment of the subject to the role treats roles as a list in which roles are organized in rank order based on the rank order of the roles, and is written as a combination of the role list and the subject. A role list that reflects the rank order therefore treats "accounting division, general affairs division" and "general affairs division, accounting division" as different items, and combines the items with different subjects.

In the case where there is no rank order among roles or the rank order is not taken into account, roles on a role list may be organized in given order. For example, roles or character strings corresponding to roles can be organized in the order of character codes, alphabetically, or in the order of the Japanese syllabary. To give a concrete example, instead of discriminating "accounting division, general affairs division" and "general affairs division, accounting division" from each other, the general affairs division role and the accounting division role may be organized in the order of the Japanese syllabary to be noted as "accounting division, general affairs division".

In the case where some roles have a rank order and other roles do not have a rank order, different notation modes may be used depending on whether there is a rank order or not. For example, roles that have a rank order may be put between brackets "H" whereas roles that do not have a rank order are put between parentheses "Q". As a concrete example, a notation "([A Corporation accounting division, A Corporation general affairs division], [B Corporation accounting division, B Corporation general affairs division])" includes "([A Corporation accounting division, A Corporation general affairs division], [B Corporation accounting division, B Corporation general affairs division])" and "[B Corporation accounting division, B Corporation general affairs division], [A Corporation accounting division, A Corporation general affairs division])" both, and does not include "([A Corporation accounting division, A Corporation general affairs division], [B Corporation general affairs division, B Corporation accounting division])", "([A Corporation general affairs division, A Corporation accounting division], [B Corporation accounting division, B Corporation general affairs division])", and the like.

By thus applying the role list, selecting and standardizing a certain notation method makes it possible to select the extent of roles to be grouped into and treated as a combination, and ultimately to select the unit of subjects for assigning authority permissions in exceptional authority permission assignment, which is described later. The role list in the following description is a role list reflecting the rank order which is the most common format. However, a role list applied in the manner described above, too, can be processed by the same configuration and operation.

"Authority permission assignment" is a description that defines a set of authority permission grants/denials in association with a role.

"Role hierarchy" or "hierarchy" means a hierarchical relation of roles based on the organization structure or the like. A role hierarchy generally has a tree structure which includes multiple hierarchical layers. For example, the role hierarchy of a business organization "A Corporation" is one tree structure where "A Corporation" is the root, "general affairs division" and "accounting division" are placed under "A Corporation", and "secretary department" and "public relations department" are further placed under "general affairs division".

There may be a plurality of tree structures as that of A Corporation of the example described above as role hierarchies. For example, a tree structure of B Corporation which is separate from the tree structure of A Corporation may coexist. The tree structure of B Corporation may be a role hierarchy where "B Corporation" is the root and, as in the role hierarchy that has "A Corporation" for the root, "general affairs division" and "accounting division" are placed under "B Corporation", and "secretary department" and "public relations department" are further placed under "general affairs division". Alternatively, the tree structure of B Corporation may have "development division" and "sales division" unlike the role hierarchy that has "A Corporation" for the root. In this invention, a conflict of authority permission grants/denials that occurs when a subject plays roles across a plurality of role hierarchies having these independent tree structures can be processed by the same configuration and operation as in the processing of a conflict of authority permission grants/denials that occurs when a subject plays roles from a role hierarchy having a single tree structure.

"Role inheritance" or "inheritance" means an inheritance relation based on the role hierarchy. For instance, in an example of the role hierarchy described above, the "secretary department" role inherits the "general affairs division" role, and the "general affairs division" role inherits the "A Corporation" role. By inheriting a role, the inheritor role inherits a set of authority permission grants/denials of the inheritance source role. The set of authority permission grants/denials of the inheritor is higher in priority than the set of authority permission grants/denials of the inheritance source, and authority permission grants/denials of the inheritance source can be modified with authority permission grants/denials of the inheritor. Therefore, while the sets of authority permission grants/denials of the inheritance source role and the inheritor role both are applied to a subject who has the inheritor role, when the same authority permission is combined with one of grant and denial in the inheritance source role and with the other of grant and denial in the inheritor role, the authority permission grant/denial of the inheritor role is applied. With the exception of an "exceptional role", a role has only one inheritance source role.

"Direct descendant role" or "direct descendant" means a role that is a direct descendant of an arbitrary role when inheritance is to be viewed as a parent-child relation where the child inherits from the parent, and corresponds to a set that groups together this role, ancestor roles, and descendant roles. The ancestor roles are all roles that belong to role groups along a trail from the role in question to the inheritance source toward the root of a role hierarchy having a tree structure. Descendant roles are all roles that belong to role groups along a trail from the role in question to the inheritor toward a leaf of the role hierarchy having a tree structure. Direct descendant roles in a tree structure are accordingly a set that groups together a role in question, role groups along a trail from the role to the inheritance source toward the root, and role groups along a trail from the role to the inheritor toward a leaf. A subject has a plurality of roles but the roles must not be in a direct descendant relation. For instance, in an example of the role hierarchy described above, a subject belonging to the secretary department in the general affairs division of A Corporation has only the "secretary department" role, and does not have the "A Corporation" role and the "general affairs division" role. A subject who works in the general affairs division of A Corporation and the accounting division of A Corporation has the "general affairs division" role and the "accounting division" role, and does not have the "A Corporation" role, the "secretary department" role, and the "public relations department" role.

"Exceptional role" or "exception" is a virtual role to which a set of extracted subjects is automatically assigned. The extracted subjects are only subjects who play a plurality of roles and whose authority permission grants/denials conflict between the roles, and the extraction is executed for each of role lists associated with the subjects.

An exceptional role uses, as its identifier, role lists associated with subjects to which the exceptional role is assigned. In authority permission assignment of an exceptional role, only authority permissions assigned to roles of the relevant subject set that conflict between the roles are presented, and authority permission grants/denials are specified for the presented authority permissions.

The exceptional role is treated as a multiple-inheritance source role which has all roles listed on the role lists as inheritance sources, and the authority permission assignment of the exceptional role which is the inheritor is given preference over the authority permission assignment of the inheritance source roles on the role lists.

The exceptional role is also a direct descendant role of the roles on the role lists, and a subject who is assigned the exceptional role is therefore virtually excluded from the assignment of the roles on the role lists. Accordingly, with regard to the subject who is assigned the exceptional role, authority permission grants/denials of the roles on the role lists that do not conflict between roles are inherited to the exceptional role and thereby applied as they are, whereas authority permission grants/denials of the roles on the role lists that conflict between roles conform to the authority permission assignment of the exceptional role. This way, a subject who has one or more of the roles on the role lists but is not assigned the exceptional role, i.e., a subject who does not play a plurality of roles or who is assigned roles in a different combination or in a different rank order is not affected by the exceptional role. The influence of an authority permission modification in the exceptional role can therefore be contained within the extent of items involved in the modification, and there is no need to consider excluding an authority permission or a subject prior to authority permission assignment or subject assignment to each role for the purpose of avoiding a conflict.

"Exceptional authority permission assignment" is a description that defines a set of authority permission grants/denials in association of an exceptional role. The identifier of the exceptional role is role lists, and an exceptional authority permission assignment is therefore written in the form of a combination of a role list and a set of authority permission grants/denials.

(Access Control System 100)

An access control system 100 which is an embodiment mode of this invention is described. Referring to FIG. 1, the access control system 100 includes a role hierarchy storing unit 1, a subject assignment storing unit 2, an authority permission assignment storing unit 3, an exceptional authority permission assignment storing unit 4, a conflict detecting unit 5, and an exceptional authority permission assignment editing unit 6.

The access control system 100 is implemented by, for example, a computer system. The role hierarchy storing unit 1, the subject assignment storing unit 2, the authority permission assignment storing unit 3, the exceptional authority permission assignment storing unit 4, the conflict detecting unit 5, and the exceptional authority permission assignment editing unit 6 may be built from a computer system separate from one another, or some or all of the units may be implemented by the same computer system.

The conflict detecting unit 5 specifically includes a CPU of an information processing device that operates as programmed by a program, and a storage medium such as a RAM. The conflict detecting unit 5 also includes a communication interface for communicating with the role hierarchy storing unit 1, the subject assignment storing unit 2, the authority permission assignment storing unit 3, the exceptional authority permission assignment storing unit 4, and the exceptional authority permission assignment editing unit 6.

The exceptional authority permission assignment editing unit 6 specifically includes a CPU of an information processing device that operates as programmed by a program, and a storage medium such as a RAM. The exceptional authority permission assignment editing unit 6 also includes a communication interface for communicating with the exceptional authority permission assignment storing unit 4 and the conflict detecting unit 5.

The role hierarchy storing unit 1, the subject assignment storing unit 2, the authority permission assignment storing unit 3, and the exceptional authority permission assignment storing unit 4 are specifically implemented by a CPU of an information processing device that operates as programmed by a program, and a storage medium such as a RAM or a hard disk.

The role hierarchy storing unit 1 stores a role hierarchy, and searches for and provides a relation between roles in response to a request from the conflict detecting unit 5.

The subject assignment storing unit 2 stores a subject assignment, and searches for and provides a relation between a subject and a role list in response to a request from the conflict detecting unit 5.

The authority permission assignment storing unit 3 stores an authority permission assignment, and searches for and provides a relation between a role and authority permission grants/denials in response to a request from the conflict detecting unit 5.

The exceptional authority permission assignment storing unit 4 stores an exceptional authority permission assignment, and searches for and provides a relation between a role list that is the identifier of the exceptional role and authority permission grants/denials in response to a request from the conflict detecting unit 5. The exceptional authority permission assignment storing unit 4 also stores an exceptional authority permission assignment that is handed over from the exceptional authority permission assignment editing unit 6.

The conflict detecting unit 5 obtains a role hierarchy from the role hierarchy storing unit 1, obtains a subject assignment from the subject assignment storing unit 2, obtains an authority permission assignment from the authority permission assignment storing unit 3, and obtains an exceptional authority permission assignment from the exceptional authority permission assignment storing unit 4. Based on the role hierarchy, the subject assignment, the authority permission assignment, and the exceptional authority permission assignment, the conflict detecting unit 5 checks whether or not authority permission grants/denials of roles of the same subject include a combination of an authority permission and a grant and a combination of the same authority permission and a denial. When such authority permission is found, the conflict detecting unit 5 hands over the role list and the conflicting authority permission sets to the exceptional authority permission assignment editing unit 6 as a conflict. The conflict detecting unit 5 may start the processing automatically with an update of the stored contents of the role hierarchy storing unit, the subject assignment storing unit 2, the authority permission assignment storing unit 3, or the exceptional authority permission assignment storing unit 4 as a trigger, or may start the processing with a request from the exceptional authority permission assignment editing unit 6 as a trigger.

The exceptional authority permission assignment editing unit 6 obtains a role list where there is a conflict and conflicting authority permission sets from the conflict detecting unit 5, and provides a user interface (UI) for editing the grants/denials of the authority permission sets by way of a Web form or the like. When a result of editing on the UI is received, the exceptional authority permission assignment editing unit 6 creates an exceptional authority permission assignment from the specifics of the editing, and hands it over to the exceptional authority permission assignment storing unit 4.

(Outline of the Operation of the Access Control System 100)

Figure 2:
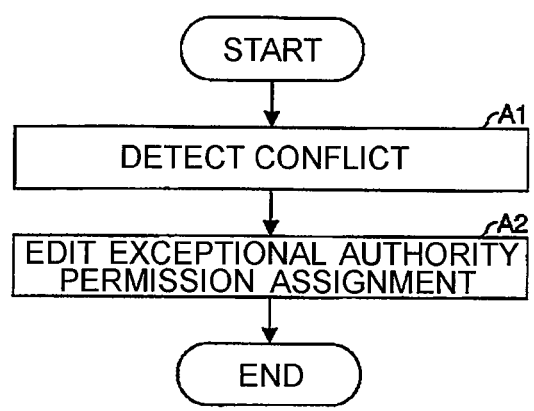
FIG. 2 is a flow chart illustrating the operation of the access control system 100.

An outline of the operation of the access control system 100 is described with reference to FIG. 2. In the access control system 100, conflict detection processing is performed first by the conflict processing unit 5 (Step A1). Exceptional authority permission assignment editing processing is performed next by the exceptional authority permission assignment editing unit 6 (Step A2).

(Conflict Detection Processing Executed when there is No Exceptional Authority Permission Assignment)

Figure 3:
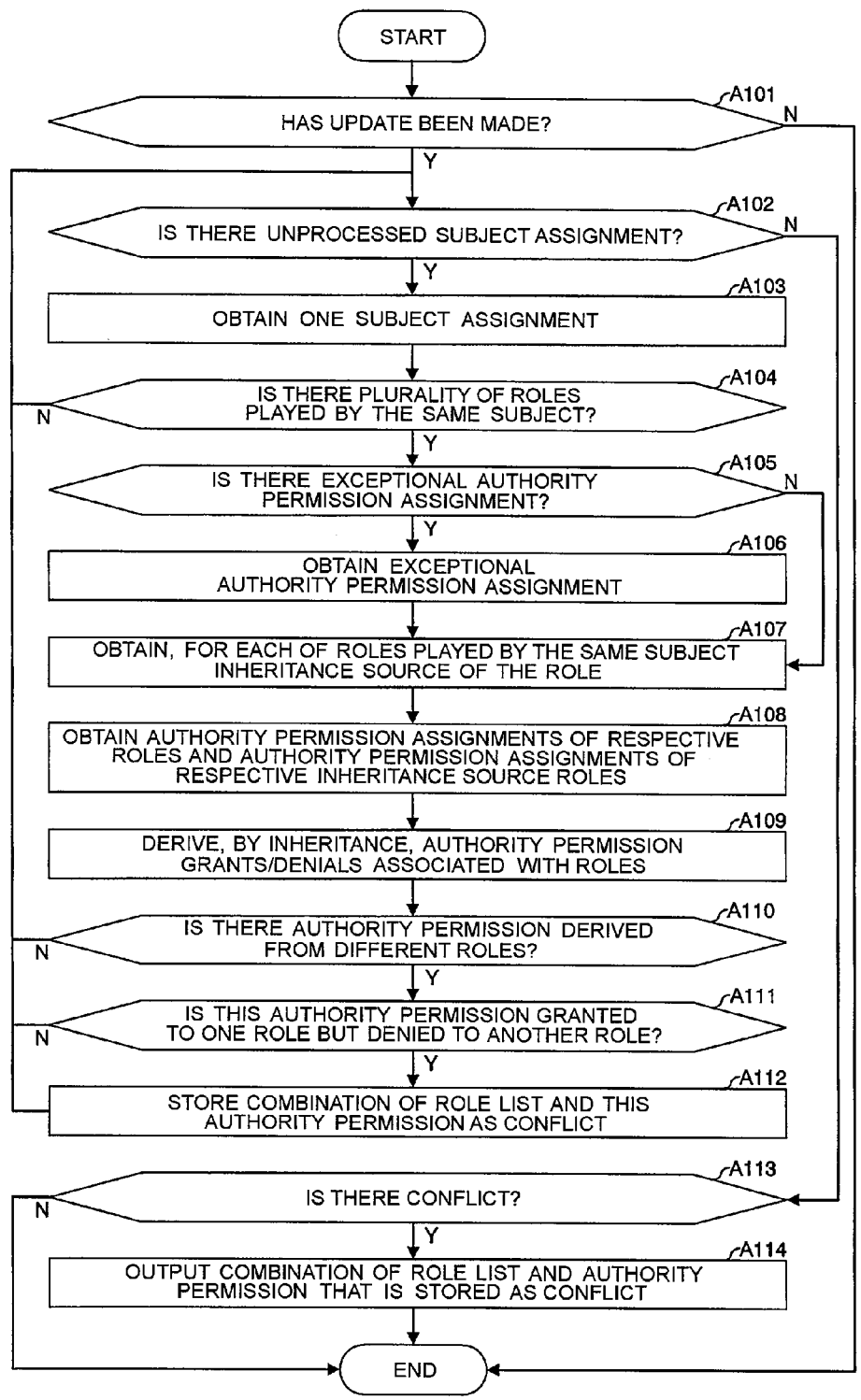
FIG. 3 is a flow chart illustrating conflict detection processing which is executed by a conflict detecting unit 5.

The conflict detection processing performed by the conflict processing unit 5 is described in detail with reference to FIG. 3.

(1) Step A101

The conflict detecting unit 5 first checks whether an update such as a new addition or a change has been made to at least one of the role hierarchy storing unit 1, the subject assignment storing unit 2, the authority permission assignment storing unit 3, and the exceptional authority permission assignment storing unit 4. The conflict detecting unit 5 proceeds to Step A102 in the case where an update has been made, and ends the processing in the case where no update has been made.

(2) Step A102

The conflict detecting unit 5 next checks whether there is an unprocessed subject assignment. The conflict detecting unit 5 proceeds to Step A103 in the case where an unprocessed subject assignment is found, and moves to Step A113 in the case where no unprocessed subject assignment is found.

(3) Step A103

The conflict detecting unit 5 next obtains one subject assignment from the subject assignment storing unit 2. For example, a subject assignment has information illustrated in FIG. 4, and one subject assignment corresponds to one record of a table of FIG. 4.

(4) Step A104

The conflict detecting unit 5 next checks whether a subject written in the obtained subject assignment is playing a plurality of roles. The conflict detecting unit 5 proceeds to Step A105 in the case where such subject is found, and moves to Step A102 in the case where no such subject is found. For example, subjects in a record of the table of FIG. 4 that has "(accounting division, general affairs division)" as the role list are each playing a plurality of roles.

(5) Step A105

The conflict detecting unit 5 next refers to the exceptional authority permission assignment storing unit 4 to check whether an exceptional authority permission assignment is found for the role list of the subject assignment that is being processed, namely, the role list of the one subject assignment that is determined in Step A104 as a list that includes roles played by the same subject. The conflict detecting unit 5 proceeds to Step A106 in the case where an exceptional authority permission assignment is found, and moves to Step A107 in the case where no exceptional authority permission assignment is found. The case where no associated exceptional authority permission assignment is found is described here, and the case where an associated exceptional authority permission assignment is found is described later.

(6) Step A106

The conflict detecting unit 5 next obtains from the exceptional authority permission assignment storing unit 4 an exceptional authority permission assignment for the role list of the subject assignment that is being processed, namely, the role list of the one subject assignment that is determined in Step A4 as a list that includes roles played by the same subject and that is determined in Step A5 as having an exceptional authority permission assignment.

(7) Step A107

The conflict detecting unit 5 next refers to the role hierarchy storing unit 1 to obtain ancestor roles that are inheritance sources of the respective roles listed on the role list of the subject assignment that are related to each other in that the roles are played by the same subject.

For example, the role hierarchy has information illustrated in FIG. 5, and an ancestor role that is the inheritance source of the "general affairs division" role is the "A Corporation" role, and an ancestor role that is the inheritance source of the "accounting division" role is the "A Corporation" role. For reference, the "public relations department" role has the "general affairs division" role, and the "A Corporation" role as well, as ancestor roles that are the inheritance sources of the "public relations department" role.

(8) Step A108

The conflict detecting unit 5 next refers to the authority permission assignment storing unit 3 to obtain an authority permission assignment for each role listed on the role list of the subject assignment that is being processed, and for each ancestor role that is the inheritance source of the listed role. For example, an authority permission assignment has information illustrated in FIG. 6. In a table of FIG. 6, a combination of an authority permission, e.g., "(kaishafile1, read)", and a grant/denial, e.g., "permit", "(kaishafile1, read, permit) constitutes an authority permission grant/denial. Here, "permit" means a grant and "deny" means a denial.

(9) Step A109

The conflict detecting unit 5 next performs the following processing as a step preceding the derivation of authority permission grants/denials associated with the role list of the subject assignment that is being processed:

For each role listed on the role list that is being processed, in other words, for each of roles that a subject plays, the conflict detecting unit 5 determines whether or not there is an ancestor role and, when there is an ancestor role, processes the ancestor role as the inheritance source to derive post-inheritance authority permission grants/denials.

In the case where there is an exceptional authority permission assignment for the role list, authority permission grants/denials of a case where an exceptional role inherits one of the roles on the role list are derived in this step as authority permission grants/denials of each role on the role list. For example, authority permission grants/denials of an exceptional role that inherits only the general affairs division role are treated as the result of deriving authority permission grants/denials of the general affairs division role, and authority permission grants/denials of an exceptional role that inherits only the accounting division role are treated as the result of deriving authority permission grants/denials of the accounting division role. However, the case where no associated exceptional authority permission assignment is found is described here, and the case where an associated exceptional authority permission assignment is found is described later.

Authority permission grants/denials after the inheritance processing which are associated with the respective roles listed on the role list are, for example, information as illustrated in FIG. 7. As an example of modification by inheritance, in FIG. 6, the authority permission grant/denial of the "A Corporation" role which is the inheritance source is "(kaishafile1, write, deny)" before the role inheritance processing, and the authority permission grant/denial of the "general affairs division" role which is the inheritor is "(kaishafile1, write, permit)" before the role inheritance processing. The authority permission grant/denial of the "general affairs division" role in FIG. 7 is therefore "(kaishafile1, write, permit)" after the role inheritance processing. In the case of deriving authority permission grants/denials of the "secretary department" role and the "public relations department" role which have the "general affairs division" role as the inheritance source, the derived authority permission grant/denial is similarly "(kaishafile1, write, permit)" because the "general affairs division" role is inherited.

(10) Step A110

The conflict detecting unit 5 next compares authority permissions of the respective roles derived in Step A109 to check whether different roles have assignments about the same authority permission. The conflict detecting unit 5 proceeds to Step A111 in the case where such assignment is found, and moves to Step A102 in the case where no such assignment is found.

For example, in the case of the "general affairs division" role and the "accounting division" role in FIG. 7, assignments about the same authority permission for different roles are authority permissions "(kaishafile1, read)", "(kaishafile1, write)", "(kaishafile2, read)", "(kaishafile2, write)", "(kaikeifile1, read)", "(kaikeifile1, write)", "(manualfile1, read)", and "(manualfile1, write)".

In the case where there is an exceptional authority permission assignment associated with the role list, the authority permission assignment of every role has the same authority permission grants/denials with respect to authority permissions that are defined in the exceptional authority permission assignment, and the comparison processing may be omitted for these authority permissions. In the comparison processing, at least post-inheritance authority permissions that are derived from authority permissions of the respective roles listed on the role list, namely, authority permissions that are not specified in the exceptional authority permission assignment are compared.

(11) Step A111

The conflict detecting unit 5 next compares the assignments about the same authority permission for different roles to see whether the authority permission is combined with a grant for one role and with a denial for another role. The conflict detecting unit 5 proceeds to Step A112 in the case where the authority permission is combined with both a grant and a denial, and moves to Step A102 in the case where the authority permission is combined with only one of grant and denial.

For example, in the case of the "general affairs division" role and the "accounting division" role in FIG. 7, out of the assignments about the same authority permission for different roles, the authority permissions "(kaikeifile1, read)", "(kaikeifile1, write)", and "(manual1, write)" are combined with a grant for one role and with a denial for the other role.

In the case where there is an exceptional authority permission assignment associated with the role list, the authority permission assignment of every role has the same authority permission grants/denials with respect to authority permissions that are defined in the exceptional authority permission assignment, and the comparison processing may be omitted for these authority permissions. In the comparison processing, at least post-inheritance authority permissions that are derived from authority permissions of the respective roles listed on the role list, namely, authority permissions that are not specified in the exceptional authority permission assignment are compared.

(12) Step A112

The conflict detecting unit 5 next determines this authority permission as a conflict and stores the authority permission in combination with the role list that is being processed. For example, the authority permissions "(kaikeifile1, read)", "(kaikeifile1, write)", and "(manualfile1, write)" detected in the example of Step A111 are stored in combination with the role list that is being processed, "(accounting division, general affairs division)".

(13) Step A113

The conflict detecting unit 5 next checks whether a conflict has been stored. The conflict detecting unit 5 proceeds to Step A114 in the case where a conflict has been stored, and ends the processing in the case where no conflict has been stored.

(14) Step A114

The conflict detecting unit 5 next outputs to the exceptional authority permission assignment editing unit 6 a combination of a role list and authority permissions stored as a conflict. For example, information as illustrated in FIG. 8 is output as a conflict.

(Exceptional Authority Permission Assignment Editing Processing)

Figure 9:
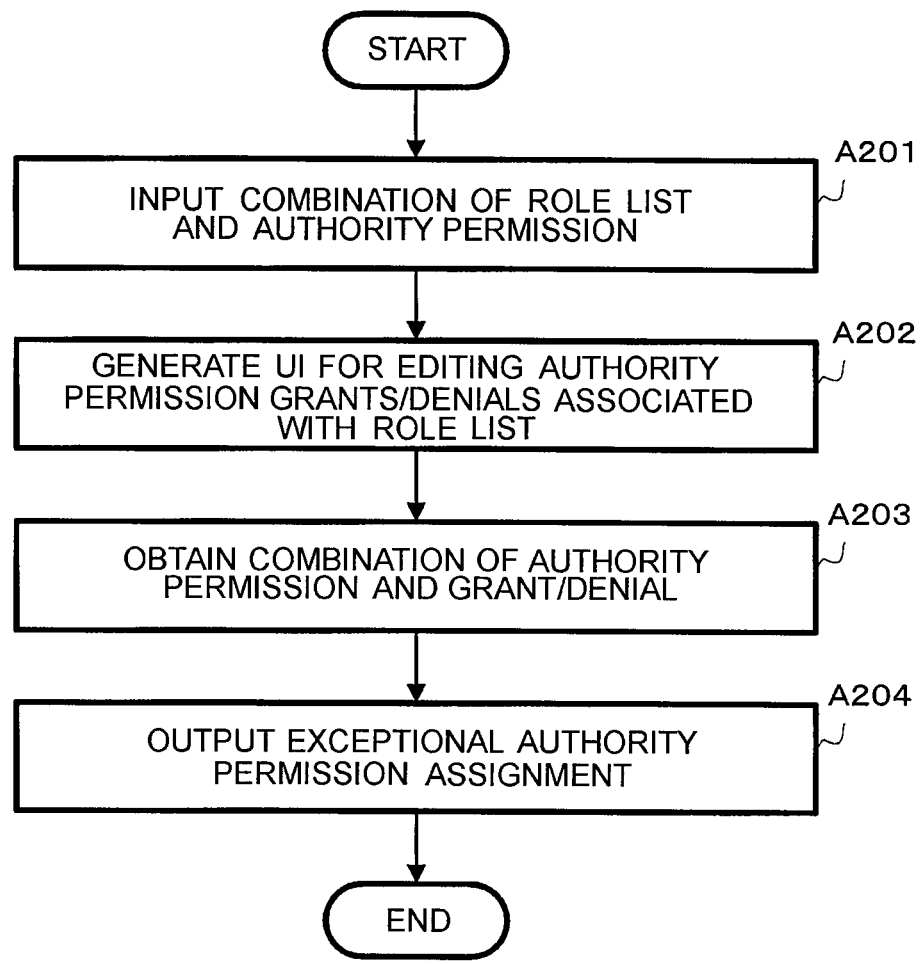
FIG. 9 is a flow chart illustrating exceptional authority permission assignment editing processing which is executed by an exceptional authority permission assignment editing unit 6.

The operation in exceptional authority permission assignment editing processing is described in detail with reference to FIG. 9.

(1) Step A201

First, one or more combinations of a role list and a set of authority permissions are input to the exceptional authority permission assignment editing unit 6 from the conflict detecting unit 5 as conflicts. For example, the information of FIG. 8 is input as a conflict.

(2) Step A202

The exceptional authority permission assignment editing unit 6 next generates, for each role list where a conflict has occurred, a UI for inputting grants/denials for the conflicting authority permissions, and provides the UI to a user by displaying an input method. For example, the exceptional authority permission assignment editing unit 6 uses a UI illustrated in FIG. 10 to provide a grant/denial input form to the user.

(3) Step A203

The exceptional authority permission assignment editing unit 6 next obtains the specifics of an input made by the user with the use of the generated UI. For example, the exceptional authority permission assignment editing unit 6 obtains a combination of the authority permission "(kaikeifile1, read)" and the grant/denial identifier "permit", a combination of the authority permission "(kaikeifile1, write)" and the grant/denial identifier "deny", and a combination of the authority permission "(manualfile1, write)" and the grant/denial identifier "permit" as the specifics of an input to the UI illustrated in FIG. 10.

(4) Step A204

The exceptional authority permission assignment editing unit 6 next generates an exceptional authority permission assignment with the use of the grants/denials input by the user, and outputs the exceptional authority permission assignment to the exceptional authority permission assignment storing unit 4. For example, information as illustrated in FIG. 11 is output as an exceptional authority permission assignment.

(Conflict Detection Processing Executed when there is an Exceptional Authority Permission Assignment)

A description is given on an operation that is performed when it is determined in Step A105 that there is an exceptional authority permission assignment associated with the role list of one subject assignment which is determined in Step A104 as a list that includes roles played by the same subject. Described here is a case where, after the exceptional authority permission assignment of FIG. 11 is generated by executing Steps A201 to A204, Step A101 is executed again due to another update or request.

In this case, the exceptional authority permission assignment of FIG. 11 is found in Step A105 where the role list "(accounting division, general affairs division)" is being processed. Because there is an associated exceptional authority permission assignment, the exceptional authority permission assignment of the role list "(accounting division, general affairs division)" is obtained in the next step, Step A106.

Next, in Steps A107, and A108, the same processing as the one described above is performed. In Step A109, because the exceptional authority permission assignment of the role list "(accounting division, general affairs division)" exists, in addition to the roles "general affairs division" and "accounting division" on the role list, as an inheritor of the roles "general affairs division" and "accounting division", authority permission grants/denials of the "general affairs division" role and the "accounting division" role after the inheritance processing are information as illustrated in FIG. 12.

Next, Step A110 yields the same result as that of the processing described above. In Step A111, assignments about the same authority permission for different roles are compared to check whether the authority permission is combined with a grant for one role and with a denial for another role. The comparison reveals that, for every authority permission, the authority permission is combined with the same one of grant and denial for different roles. Alternatively, in the case where the comparison processing is omitted in Step A111 for authority permissions that are defined in the exceptional authority permission assignment, the comparison reveals that, for every remaining authority permission, the authority permission is combined with the same one of grant and denial for different roles. In the case where the comparison processing is omitted in Step A110 for authority permissions that are defined in the exceptional authority permission assignment, there are no assignments about the same authority permission for different roles in which the authority permission is combined with a grant for one role and with a denial for another role, and the conflict detecting unit 5 skips Step A111 to proceed to Step A112.

As a result, the role list "(accounting division, general affairs division)" does not include a conflict and is excluded from conflicts output in Steps A113 and A114.

For example, if a further update is subsequently made to authority permission assignments so that other authority permissions that are not defined in the exceptional authority permission assignment conflict between the "general affairs division" role and the "accounting division" role, the processing of Step A109 which uses the exceptional authority permission assignment of FIG. 11 leaves conflicts of the updated other authority permissions between the "general affairs division" role and the "accounting division" role. The newly conflicting authority permissions alone are therefore detected in Step A110.

An access control system according to this invention thus resolves existing conflicts with an exceptional authority permission assignment of an exceptional role, detects only new conflicts, and provides an exceptional authority permission assignment editing unit for the new conflicts.

Embodiment

The operation of the access control system 100 is described next on the premise that the subject assignments of FIG. 4, the role hierarchy of FIG. 5, and values stored in the authority permission assignments of FIG. 6 are used. At the moment, the storing units of the access control system 100 are storing the following data:

Role hierarchy storing unit 1 a role hierarchy (FIG. 5)

Subject assignment storing unit 2 nil

Authority permission assignment storing unit 3 authority permission assignments (FIG. 6)

Exceptional authority permission assignment storing unit 4 nil

An operator of the access control system 100 now inputs subject assignments (FIG. 4), which are then stored in the subject assignment storing unit 2.

The conflict detecting unit 5 detects the storing of the subject assignments as an update (Step A101). The subject assignments are all unprocessed (Step A102), and the conflict detecting unit 5 therefore obtains and processes the subject assignments one record at a time from the top downward (Step A103).

The conflict detecting unit 5 refers to the subject assignments stored in the subject assignment storing unit 2 one record at a time to determine whether or not a subject is playing a plurality of roles. The first record does not hold roles played by the same subject, and the conflict detecting unit 5 accordingly moves on to the second record, which is the same as the first record. The third record holds a plurality of roles on the role list, specifically, the general affairs division role and the accounting division role, played by the same subject (Step A104).

The exceptional authority permission assignment storing unit 4 is not storing any exceptional authority permission assignment at the time (Step A105), and the conflict detecting unit 5 accordingly skips Step A106.

The conflict detecting unit 5 refers to the role hierarchy storing unit 1 to obtain the A Corporation role as the inheritance source of the general affairs division role of the third record and as the inheritance source of the accounting division role of the third record (Step A107).

The conflict detecting unit 5 refers to the authority permission assignment storing unit 3 to obtain the respective authority permission assignments of the general affairs division role, the accounting division role, and the A Corporation role (Step A108).

The conflict detecting unit 5 derives authority permission grants/denials of the general affairs division role from the authority permission assignment of the general affairs division role and from the authority permission assignment of the A Corporation role which is the inheritance source of the general affairs division role. The conflict detecting unit 5 similarly derives authority permission grants/denials of the accounting division role from the authority permission assignment of the accounting division role and from the authority permission assignment of the A Corporation role which is the inheritance source of the accounting division role (Step A109). When the grant/denial of an authority permission for the inheritor role does not match the grant/denial of the same authority permission for the inheritance source role, the authority permission grant/denial of the inheritor role is given priority. A description is given taking as an example of the derivation of authority permission grants/denials of the general affairs division role.

For authority permission grants/denials that are not defined in the authority permission assignment of the general affairs division role but are defined in the authority permission assignment of the A Corporation role, the authority permission assignment of the A Corporation role which is the inheritance source is applied. Referring to the authority permission assignments of FIG. 6, whether actions "read" and "write" are granted/denied with respect to an object "kaishafile2" is defined for the A Corporation role but not for the general affairs division role. Authority permission grants/denials of the general affairs division role in this case inherit the authority permission assignment of the A Corporation role as illustrated in the authority permission grants/denials of FIG. 7.

Conversely, for authority permission grants/denials that are defined in the authority permission assignment of the general affairs division role but are not defined in the authority permission assignment of the A Corporation role, authority permission grants/denials of the general affairs division role are applied as they are. A reference to FIG. 6 shows that whether the actions "read" and "write" are granted or denied with respect to objects "soumufile1", "kaikeifile1", and "manual1", respectively, is defined for the general affairs division role but not for the A Corporation role. In this case, the authority permission assignment of the general affairs division role is applied as it is to authority permission grants/denials of the general affairs division role as illustrated in FIG. 7.

For authority permission grants/denials that are defined in the authority permission assignment of the general affairs division role and the authority permission assignment of the A Corporation role both, the authority permission assignment of the general affairs division role which is the inheritor is applied. A reference to FIG. 6 shows that whether the actions "read" and "write" are granted/denied with respect to an object "kaishafile1" is defined for both roles, and whether the action "write", in particular, is granted or denied differs between the two roles. Authority permission grants/denials of the general affairs division role are applied in this case as illustrated in FIG. 7.

Among the authority permission grants/denials obtained in Step A109, the conflict detecting unit 5 detects authority permission grants/denials of the general affairs division role and the accounting division role that define, for the same authority permission, whether the authority permission is granted or denied (Step A110). The authority permission grants/denials of the general affairs division role and the accounting division role obtained in Step A109 are as illustrated in FIG. 7. Of these authority permission grants/denials, authority permission grants/denials about the actions "read" and "write" with respect to the objects "kaishafile1", "kaishafile2", "kaikeifile1", and "manual1" are assigned for both roles. In the case where no authority permissions meet the criterion, the conflict detecting unit 5 returns to Step A102 to move on to the next record of the subject assignments as the processing target.

Among the authority permission grants/denials of the same authority permission derived from different roles which have been obtained in Step A110, the conflict detecting unit 5 detects authority permission grants/denials in which the grant/denial of an authority permission for one role does not match the grant/denial of the same authority permission for another role (Step A111). A reference to FIG. 7 shows that the general affairs division role and the accounting division role have different authority permission grants/denials from each other about the actions "read" and "write" with respect to the object "kaikeifile1", and about the action "write" with respect to the object "manual1". In the case where no authority permission grants/denials meet the criterion, the conflict detecting unit 5 returns to Step A102 to move on to the next record of the subject assignments as the processing target. It is found out through Steps A104 to A111 that there is a subject who plays a plurality of roles, and that there is an authority permission A which is defined for one of the plurality of roles, a role R1, and another of the plurality of roles, a role R2, both, and which is granted to one of the roles R1 and R2 and denied to the other of the roles R1 and R2. A virtual role constituted of the roles R1 and R2 in this case is called an exceptional role, and an assignment of authority permissions to an exceptional role is called an exceptional authority permission assignment.

The conflict detecting unit 5 determines, as an authority permission conflicting between roles, the authority permission detected in Step A111 which is granted to one role and denied to the other role, stores the authority permission in association with the role list (Step A112), and returns to Step A102. Specifically, a role list constituted of the role R1 and the role R2, "(R1, R2)" is associated with the authority permission A. To give a concrete example, the role list "(general affairs division, accounting division)" is stored in association with an authority permission "(kaikeifile1, read)", an authority permission "(kaikeifile1, write)", and an authority permission "(manual1, write)".

The conflict detecting unit 5 executes the processing of Steps A102 to A112 sequentially for the remaining records of the subject assignments stored in the subject assignment storing unit 2. In the case where a conflict is detected in one of the records (Step A113), the conflict detecting unit 5 outputs, as a conflict, to the exceptional authority permission assignment editing unit 6, the association between the role list and the authority permission stored in Step A112 (Step A114).

At the time the third record has been processed, the fourth record and the fifth record remain in the subject assignments of FIG. 4 as unprocessed records. Neither of these records holds roles that are played by the same subject and, when all the records have been processed, the only record where a conflict has been detected is the third record. The conflict of FIG. 8 is therefore output.

The exceptional authority permission assignment editing unit 6 receives the conflict of FIG. 8 from the conflict detecting unit 5 (Step A201), generates an input receiving screen of FIG. 10 based on the conflict, and displays on a screen of an image display device (not shown) (for example, a CRT or liquid crystal display device) (Step A202). This input receiving screen is displayed for each role list where a conflict has occurred, and is constituted of the role list where a conflict has occurred, objects and actions of conflicting authority permissions, and checkboxes which indicate whether the authority permissions are granted or denied. In the conflict of FIG. 8, a conflict has occurred only in the role list constituted of the accounting division role and the general affairs division role, and only the input receiving screen of FIG. 10 is accordingly generated and displayed. In the case where there are conflicts in a plurality of role lists, an input receiving screen is generated and displayed for each of the role lists.

The operator views the input receiving screen on the image display device, and uses an input device (not shown) (for example, a keyboard and/or a mouse) to make an input for newly setting the authority permission grants/denials of the conflicting authority permissions, and the exceptional authority permission assignment editing unit 6 receives this input (Step A203). In the screen of FIG. 10, the grant/denial of the action "read" with respect to the object "kaikeifile1" of the role list "(accounting division, general affairs division)" where a conflict has occurred is set to grant ("permit"), the grant/denial of the action "write" with respect to the same object is set to denial ("deny"), and the grant/denial of the action "write" with respect to the object "manual1" is set to grant.

Based on this input from the operator, the exceptional authority permission assignment editing unit 6 generates an exceptional authority permission assignment, which is then stored in the exceptional authority permission assignment storing unit 4 (Step A204). FIG. 11 is an exceptional authority permission assignment that reflects what is input in the input receiving screen of FIG. 10 as it is.

Described next is the operation of the access control system 100 in the case where an exceptional authority permission assignment is stored in the exceptional authority permission assignment storing unit 4. At the moment, the storing units of the access control system 100 are storing the following data:

Role hierarchy storing unit 1 a role hierarchy (FIG. 5)
Subject assignment storing unit 2 nil
Authority permission assignment storing unit 3 authority permission assignments (FIG. 6)
Exceptional authority permission assignment storing unit 4 an exceptional authority permission assignment (FIG. 11)

In this state, the operator of the access control system 100 inputs subject assignments (FIG. 4), which are then stored in the subject assignment storing unit 2. The conflict detecting unit 5 performs the same operation as the one described above on the first, second, fourth, and fifth records of the subject assignments.

Because an exceptional authority permission assignment is stored, the operation performed on the third record departs from the one described above in Step A105 and subsequent steps. The conflict detecting unit 5 refers to the exceptional authority permission assignment storing unit 4 in Step A105 and finds out that a role list that corresponds to the role list "(accounting division, general affairs division)" of the third record is included in the exceptional authority permission assignment (Step A105). Accordingly, unlike the description given above, the conflict detecting unit 5 obtains authority permissions of the corresponding role list and the grants/denials of the authority permissions from the exceptional authority permission assignment (Step A106).

The conflict detecting unit 5 refers to the role hierarchy storing unit 1 to obtain the A Corporation role as the inheritance source of the general affairs division role of the third record of the subject assignments and as the inheritance source of the accounting division role of the third record of the subject assignments (Step A107).

The conflict detecting unit 5 obtains from the authority permission assignment storing unit 3 the respective authority permission assignments of the general affairs division role, accounting division role, and A Corporation role obtained in Step A107. The conflict detecting unit 5 further refers to the exceptional authority permission assignment storing unit 4 to obtain an exceptional authority permission assignment of the exceptional role "(accounting division, general affairs division)" (Step A108).

Based on the authority permission assignments and exceptional authority permission assignment obtained in Step A108, the conflict detecting unit 5 derives authority permission grants/denials of the respective roles after the inheritance processing (Step A109). In the example given here, the conflict detecting unit 5 derives the respective authority permission grants/denials of the accounting division role and the general affairs division role based on the respective authority permission assignments of the accounting division role, the general affairs division role, and the A Corporation role, and on the exceptional authority permission assignment of the exceptional role "(accounting division, general affairs division)".

FIG. 12 illustrates the authority permission grants/denials of the general affairs division role and the accounting division role which are derived based on the authority permission assignments of FIG. 6 and on the exceptional authority permission assignment of FIG. 11. When the grant/denial of an authority permission for the inheritor role does not match the grant/denial of the same authority permission for the inheritance source role, the authority permission grant/denial of the inheritor role is given priority. Because the accounting division role is an inheritance source role of the exceptional role, the authority permission grant/denial of the exceptional role is given priority when the grant/denial of an authority permission for the accounting division role does not match the grant/denial of the same authority permission for the exceptional role. The same applies to the general affairs division role. As a result, FIG. 12 differs from FIG. 7, which illustrates authority permission grants/denials of the case where no exceptional authority permission assignment is found, in regard to the grant/denial of the authority permission "(kaikeifile1, read)" of the general affairs division role, the grant/denial of the authority permission "(kaikeifile1, write)" of the accounting division role, and the grant/denial of the authority permission "(manual1, write)" of the accounting division role.

In Step A110, among the authority permission grants/denials obtained in Step A109, the conflict detecting unit 5 detects authority permission grants/denials of the general affairs division role and the accounting division role that define, for the same authority permission, whether the authority permission is granted or denied. The authority permission grants/denials of the general affairs division role and the accounting division role that are obtained in Step A109 here are as illustrated in FIG. 12, but the authority permission grants/denials of the general affairs division role and the accounting division role that define, for the same authority permission, whether the authority permission is granted or denied are the same as in FIG. 7.

In Step A111, among the authority permissions detected in Step A110, the conflict detecting unit 5 detects an authority permission that is granted to one role and denied to the other role. The authority permission assignments before the exceptional authority permission assignment is applied are as illustrated in FIG. 7, where some of authority permissions are granted to one role and denied to the other role. The authority permission grants/denials of the exceptional role have already been preferentially applied in Step A109 to these authority permissions which are granted to one role and denied to the other role. Therefore, the grants/denials of one role match the grants/denials of the other role in regard to all authority permissions in this step. The conflict detecting unit 5 accordingly finishes processing the third record of the subject assignments and moves to Step A102 to process the fourth record.

As a result, when the role hierarchy of FIG. 5, the subject assignments of FIG. 4, the authority permission assignments of FIG. 6, and the exceptional authority permission assignment of FIG. 11 are stored in their respective storing units, the conflict detecting unit 5 detects no conflict in the role list "(accounting division, general affairs division)". The conflict detecting unit 5 therefore does not output the role list "(accounting division, general affairs division)" in Step A114.

Consider a case where an update is subsequently made to the authority permission assignments so that there is a conflict between the "general affairs division" role and the "accounting division" role in regard to another authority permission, B, which is not defined in the exceptional authority permission assignment of FIG. 11. In this case, the processing of Step A109 which uses the exceptional authority permission assignment of FIG. 11 eliminates all conflicts but the conflict between the "general affairs division" role and the "accounting division" role in regard to the authority permission B, and the authority permission B alone is detected in Step A110.

Thus, when an authority permission is granted to one of a plurality of roles assigned to the same subject and is denied to another of the plurality of roles, the access control system 100 first detects this authority permission with the conflict detecting unit 5 to give the operator a chance to uniformize the grant/denial of this authority permission among the plurality of roles. If the operator responds by uniformizing the grant/denial among the roles via the exceptional authority permission assignment editing unit 6, the exceptional authority permission assignment editing unit 6 generates an exceptional authority permission assignment, which is then stored in the exceptional authority permission assignment storing unit 4. In this manner, the conflict detecting unit 5 does not detect conflicts in regard to authority permissions for which an exceptional authority permission assignment has already been generated, but detects only new conflicts. The access control system 100 also gives the operator a chance to uniformize among the roles, via the exceptional authority permission assignment editing unit 6, the grant/denial of an authority permission in regard to which a conflict has newly been detected.

This invention has been described above through the embodiment mode and the embodiment but is not limited thereto, and it goes without saying that modifications can be made freely thereto within the technical scope of this invention. For example, the role hierarchy storing unit 1, the subject assignment storing unit 2, the authority permission assignment storing unit 3, and the exceptional authority permission assignment storing unit 4 may be the same storage device or may be separate storage devices and, further, may each be constituted of one or more storage devices. The conflict detecting unit 5 and the exceptional authority permission assignment editing unit 6 may be implemented by running a program relevant to the processing of the former unit and a program relevant to the processing of the latter unit on the same processing device, or on separate processing devices. The access control system 100 may be implemented by a single computer or by a plurality of cooperating computers. These are obvious to the skilled in the art and would not need an explanation.

(Note 1) An access control program for controlling a computer to execute:

a step of storing a subject assignment, an authority permission assignment, and a role hierarchy together or separately in one or more storage devices, the subject assignment associating one or more roles and a subject to which the one or more roles are assigned, the authority permission assignment associating a role, an authority permission, and a grant/denial which indicates whether a subject assigned the role is granted or denied the authority permission, the role hierarchy indicating an inheritance relation between roles;

a step of determining whether or not one subject is assigned a plurality of roles in the subject assignment and, when it is determined that one subject is assigned a plurality of roles, obtaining the plurality of roles, R1, R2 . . . Rm (m is a natural number equal to or larger than 2);

a first authority permission grant/denial deriving step of deriving, by inheritance, authority permission grants/denials associated with each of the plurality of roles R1, R2 . . . Rm, based on the role hierarchy and the authority permission assignment;

a step of storing, among the authority permission grants/denials derived by inheritance, authority permissions A1, A2 . . . An (n is a natural number) which are each derived from two or more different roles out of the plurality of roles R1, R2 . . . Rm and which are each granted to one of the plurality of roles R1, R2 . . . Rm but denied to another of the plurality of roles R1, R2 . . . Rm, in one of the one or more storage devices as authority permissions that are conflicting among a combination of the plurality of roles R1, R2 . . . Rm;

a step of receiving via an input device grants/denials of the authority permissions A1, A2 . . . An for the one subject assigned the combination of the plurality of roles R1, R2 . . . Rm;

a step of storing, based on the received grants/denials, grants/denials of the authority permissions A1, A2 ... An with respect to the combination of the plurality of roles R1, R2 ... Rm in one of the one or more storage devices as an exceptional authority permission assignment for an exceptional role, which is a virtual role constituted of the combination of the plurality of roles R1, R2 ... Rm; and a second authority permission grant/denial deriving step of deriving, by inheritance, authority permission grants/denials associated with each of the plurality of roles R1, R2 ... Rm of the exceptional role, based on the role hierarchy, the authority permission assignment, and the exceptional authority permission assignment.

(Note 2) An access control program as described in note 1, in which the second authority permission grant/denial deriving step includes the steps of:

obtaining an inheritance source role of each of the plurality of roles R1, R2 ... Rm based on the role hierarchy;

obtaining authority permission grants/denials of the plurality of roles R1, R2 ... Rm and authority permission grants/denials of the inheritance source roles of the plurality of roles R1, R2 ... Rm based on the authority permission assignment, and obtaining authority permission grants/denials of the exceptional role based on the exceptional authority permission assignment; and deriving, by inheritance, authority permission grants/denials of the subject assigned the exceptional role.

(Note 3) An access control program as described in note 2, in which, when deriving, by inheritance, authority permission grants/denials of the subject assigned the exceptional role, the exceptional role is treated as a multiple-inheritance source role which has the plurality of roles R1, R2 ... Rm as inheritance sources.

(Note 4) An access control program as described in note 1, in which the first authority permission grant/denial deriving step includes the steps of:

obtaining an inheritance source role of each of the plurality of roles R1, R2 ... Rm based on the role hierarchy;

obtaining authority permission grants/denials of the plurality of roles R1, R2 ... Rm and authority permission grants/denials of the inheritance source roles of the plurality of roles R1, R2 ... Rm based on the authority permission assignment; and deriving, by inheritance, authority permission grants/denials of each of the plurality of roles R1, R2 ... Rm.

(Note 5) An access control system, including:

one or more storage devices for storing a subject assignment associating one or more roles and a subject to which the one or more roles are assigned, an authority permission assignment associating a role, an authority permission, and a grant/denial which indicates whether a subject assigned the role is granted or denied the authority permission, and a role hierarchy indicating an inheritance relation between roles;

a processing device for determining whether or not one subject is assigned a plurality of roles in the subject assignment and, when it is determined that one subject is assigned a plurality of roles, obtaining the plurality of roles, R1, R2 ... Rm (m is a natural number equal to or larger than 2);

a first authority permission grant/denial deriving processing device for deriving, by inheritance, authority permission grants/denials associated with each of the plurality of roles R1, R2 ... Rm, based on the role hierarchy and the authority permission assignment;

a processing device for storing, among the authority permission grants/denials derived by inheritance, authority permissions A1, A2 ... An (n is a natural number) which are each derived from two or more different roles out of the plurality of roles R1, R2 ... Rm and which are each granted to one of the plurality of roles R1, R2 ... Rm but denied to another of the plurality of roles R1, R2 ... Rm, in one of the one or more storage devices as authority permissions that are conflicting among a combination of the plurality of roles R1, R2 ... Rm;

a processing device for receiving via an input device grants/denials of the authority permissions A1, A2 ... An for the one subject assigned the combination of the plurality of roles R1, R2 ... Rm;

a processing device for storing, based on the received grants/denials, grants/denials of the authority permissions A1, A2 ... An with respect to the combination of the plurality of roles R1, R2 ... Rm in one of the one or more storage devices as an exceptional authority permission assignment for an exceptional role, which is a virtual role constituted of the combination of the plurality of roles R1, R2 ... Rm; and a second authority permission grant/denial deriving processing device for deriving, by inheritance, authority permission grants/denials associated with each of the plurality of roles R1, R2 ... Rm of the exceptional role, based on the role hierarchy, the authority permission assignment, and the exceptional authority permission assignment.

(Note 6) An access control system as described in note 5, in which the second authority permission grant/denial deriving processing device is configured to:

obtain an inheritance source role of each of the plurality of roles R1, R2 ... Rm based on the role hierarchy;

obtain authority permission grants/denials of the plurality of roles R1, R2 ... Rm and authority permission grants/denials of the inheritance source roles of the plurality of roles R1, R2 ... Rm based on the authority permission assignment, and obtaining authority permission grants/denials of the exceptional role based on the exceptional authority permission assignment; and derive, by inheritance, authority permission grants/denials of the subject assigned the exceptional role.

(Note 7) An access control system as described in note 6, in which, when deriving, by inheritance, authority permission grants/denials of the subject assigned the exceptional role, the exceptional role is treated as a multiple-inheritance source role which has the plurality of roles R1, R2 ... Rm as inheritance sources.

(Note 8) An access control system as described in note 5, in which the first authority permission grant/denial deriving processing device is configured to:

obtain an inheritance source role of each of the plurality of roles R1, R2 ... Rm based on the role hierarchy;

obtain authority permission grants/denials of the plurality of roles R1, R2 ... Rm and authority permission grants/denials of the inheritance source roles of the plurality of roles R1, R2 ... Rm based on the authority permission assignment; and derive, by inheritance, authority permission grants/denials of each of the plurality of roles R1, R2 ... Rm.

(Note 9) An access control method, including:

a stage of executing, by a computer, a step of storing a subject assignment, an authority permission assignment, and a role hierarchy together or separately in one or more storage devices, the subject assignment associating one or more roles and a subject to which the one or more roles are assigned, the authority permission assignment associating a role, an authority permission, and a grant/denial which indicates whether a subject assigned the role is granted or denied the authority permission, the role hierarchy indicating an inheritance relation between roles;

a stage of executing, by the computer, a step of determining whether or not one subject is assigned a plurality of roles in the subject assignment and, when it is determined that one subject is assigned a plurality of roles, obtaining the plurality of roles, R1, R2 . . . Rm (m is a natural number equal to or larger than 2);

a first authority permission grant/denial deriving stage of executing, by the computer, a step of deriving, by inheritance, authority permission grants/denials associated with each of the plurality of roles R1, R2 . . . Rm, based on the role hierarchy and the authority permission assignment;

a stage of executing, by the computer, a step of storing, among the authority permission grants/denials derived by inheritance, authority permissions A1, A2 . . . An (n is a natural number) which are each derived from two or more different roles out of the plurality of roles R1, R2 . . . Rm and which are each granted to one of the plurality of roles R1, R2 . . . Rm but denied to another of the plurality of roles R1, R2 . . . Rm, in one of the one or more storage devices as authority permissions that are conflicting among a combination of the plurality of roles R1, R2 . . . Rm;

a stage of executing, by the computer, a step of receiving via an input device grants/denials of the authority permissions A1, A2 . . . An for the one subject assigned the combination of the plurality of roles R1, R2 . . . Rm;

a stage of executing, by the computer, a step of storing, based on the received grants/denials, grants/denials of the authority permissions A1, A2 . . . An with respect to the combination of the plurality of roles R1, R2 . . . Rm in one of the one or more storage devices as an exceptional authority permission assignment for an exceptional role, which is a virtual role constituted of the combination of the plurality of roles R1, R2 . . . Rm; and a second authority permission grant/denial deriving stage of executing, by the computer, a step of deriving, by inheritance, authority permission grants/denials associated with each of the plurality of roles R1, R2 . . . Rm of the exceptional role, based on the role hierarchy, the authority permission assignment, and the exceptional authority permission assignment.

(Note 10) An access control method as described in note 9, in which the second authority permission grant/denial deriving stage includes:

a stage of executing, by the computer, a step of obtaining an inheritance source role of each of the plurality of roles R1, R2 . . . Rm based on the role hierarchy;

a stage of executing, by the computer, a step of obtaining authority permission grants/denials of the plurality of roles R1, R2 . . . Rm and authority permission grants/denials of the inheritance source roles of the plurality of roles R1, R2 . . . Rm based on the authority permission assignment, and obtaining authority permission grants/denials of the exceptional role based on the exceptional authority permission assignment; and a stage of executing, by the computer, a step of deriving, by inheritance, authority permission grants/denials of the subject assigned the exceptional role.

(Note 11) An access control method as described in note 10, in which, when deriving, by inheritance, authority permission grants/denials of the subject assigned the exceptional role, the exceptional role is treated as a multiple-inheritance source role which has the plurality of roles R1, R2 . . . Rm as inheritance sources.

(Note 12) An access control method as described in note 9, in which the first authority permission grant/denial deriving stage includes:

a stage of obtaining an inheritance source role of each of the plurality of roles R1, R2 . . . Rm based on the role hierarchy;

a stage of obtaining authority permission grants/denials of the plurality of roles R1, R2 . . . Rm and authority permission grants/denials of the inheritance source roles of the plurality of roles R1, R2 . . . Rm based on the authority permission assignment; and a stage of executing, by the computer, a step of deriving, by inheritance, authority permission grants/denials of each of the plurality of roles R1, R2 . . . Rm.

This application claims priority from Japanese Patent Application No. 2010-080187, filed on Mar. 31, 2010, the entire disclosure of which is incorporated herein by reference.

The invention claimed is:

1. A non-transitory computer readable medium storing an access control program, the access control program comprising instructions which when executed by a computer, causes the computer to perform operations, comprising:

a step of storing a subject assignment, an authority permission assignment, and a role hierarchy together or separately in one or more storage devices, the subject assignment associating one or more roles and a subject to which the one or more roles are assigned, the authority permission assignment associating a role, an authority permission, and a grant/denial which indicates whether a subject assigned the role is granted or denied the authority permission, the role hierarchy indicating an inheritance relation between roles;

a step of determining whether or not one subject is assigned a plurality of roles in the subject assignment and, when it is determined that one subject is assigned a plurality of roles, obtaining the plurality of roles, R1, R2 . . . Rm, where m is a natural number equal to or larger than 2;

a first authority permission grant/denial deriving step of deriving, by inheritance, authority permission grants/denials associated with each of the plurality of roles R1, R2 . . . Rm, based on the role hierarchy and the authority permission assignment;

a step of storing, among the authority permission grants/denials derived by inheritance, authority permissions A1, A2 . . . An, where n is a natural number, which are each derived from two or more different roles out of the plurality of roles R1, R2 . . . Rm and which are each granted to one of the plurality of roles R1, R2 . . . Rm but denied to another of the plurality of roles R1, R2 . . . Rm, in one of the one or more storage devices as authority permissions that are conflicting among a combination of the plurality of roles R1, R2 . . . Rm;

a step of receiving via an input device grants/denials of the authority permissions A1, A2 . . . An for the one subject assigned the combination of the plurality of roles R1, R2 . . . Rm;

a step of storing, based on the received grants/denials, grants/denials of the authority permissions A1, A2 . . . An with respect to the combination of the plurality of roles R1, R2 . . . Rm in one of the one or more storage devices as an exceptional authority permission assignment for an exceptional role, which is a virtual role constituted of the combination of the plurality of roles R1, R2 . . . Rm; and a second authority permission grant/denial deriving step of deriving, by inheritance, authority permission grants/denials associated with each of the plurality of roles R1, R2 . . . Rm of the exceptional role, based on the role hierarchy, the authority permission assignment, and the exceptional authority permission assignment wherein the second authority permission grant/denial deriving step comprises the steps of:

obtaining an inheritance source role of each of the plurality of roles R1, R2 . . . Rm based on the role hierarchy;

obtaining authority permission grants/denials of the plurality of roles R1, R2 . . . Rm and authority permission grants/denials of the inheritance source roles of the plurality of roles R1, R2 . . . Rm based on the authority permission assignment, and obtaining authority permission grants/denials of the exceptional role based on the exceptional authority permission assignment; and deriving, by inheritance, authority permission grants/denials of the subject assigned the exceptional role, and wherein, when deriving, by inheritance, authority permission grants/denials of the subject assigned the exceptional role, the exceptional role is treated as a multiple-inheritance source role which has the plurality of roles R1, R2 . . . Rm as inheritance sources.

2. A non-transitory computer readable medium as set forth in claim 1, wherein the first authority permission grant/denial deriving step comprises the steps of:

obtaining an inheritance source role of each of the plurality of roles R1, R2 Rm based on the role hierarchy;

obtaining authority permission grants/denials of the plurality of roles R1, R2 . . . Rm and authority permission grants/denials of the inheritance source roles of the plurality of roles R1, R2 . . . Rm based on the authority permission assignment; and deriving, by inheritance, authority permission grants/denials of each of the plurality of roles R1, R2 . . . Rm.

3. An access control system, comprising:

one or more storage devices for storing a subject assignment associating one or more roles and a subject to which the one or more roles are assigned, an authority permission assignment associating a role, an authority permission, and a grant/denial which indicates whether a subject assigned the role is granted or denied the authority permission, and a role hierarchy indicating an inheritance relation between roles;

a processing device for determining whether or not one subject is assigned a plurality of roles in the subject assignment and, when it is determined that one subject is assigned a plurality of roles, obtaining the plurality of roles, R1, R2 . . . Rm, where m is a natural number equal to or larger than 2;

a first authority permission grant/denial deriving processing device for deriving, by inheritance, authority permission grants/denials associated with each of the plurality of roles R1, R2 . . . Rm, based on the role hierarchy and the authority permission assignment;

a processing device for storing, among the authority permission grants/denials derived by inheritance, authority permissions A1, A2 . . . An, where n is a natural number, which are each derived from two or more different roles out of the plurality of roles R1, R2 . . . Rm and which are each granted to one of the plurality of roles R1, R2 . . . Rm but denied to another of the plurality of roles R1, R2 . . . Rm, in one of the one or more storage devices as authority permissions that are conflicting among a combination of the plurality of roles R1, R2 . . . Rm;

a processing device for receiving via an input device grants/denials of the authority permissions A1, A2 . . . An for the one subject assigned the combination of the plurality of roles R1, R2 . . . Rm;

a processing device for storing, based on the received grants/denials, grants/denials of the authority permissions A1, A2 . . . An with respect to the combination of the plurality of roles R1, R2 . . . Rm in one of the one or more storage devices as an exceptional authority permission assignment for an exceptional role, which is a virtual role constituted of the combination of the plurality of roles R1, R2 . . . Rm; and a second authority permission grant/denial deriving processing device for deriving, by inheritance, authority permission grants/denials associated with each of the plurality of roles R1, R2 . . . Rm of the exceptional role, based on the role hierarchy, the authority permission assignment, and the exceptional authority permission assignment;

wherein the second authority permission grant/denial deriving processing device is configured to:

obtain an inheritance source role of each of the plurality of roles R1, R2 . . . Rm based on the role hierarchy;

obtain authority permission grants/denials of the plurality of roles R1, R2 . . . Rm and authority permission grants/denials of the inheritance source roles of the plurality of roles R1, R2 . . . Rm based on the authority permission assignment, and obtain authority permission grants/denials of the exceptional role based on the exceptional authority permission assignment; and derive, by inheritance, authority permission grants/denials of the subject assigned the exceptional role, and wherein, when deriving, by inheritance, authority permission grants/denials of the subject assigned the exceptional role, the exceptional role is treated as a multiple-inheritance source role which has the plurality of roles R1, R2 . . . Rm as inheritance sources.

4. An access control system according to claim 3, wherein the first authority permission grant/denial deriving processing device is configured to:

obtain an inheritance source role of each of the plurality of roles R1, R2 . . . Rm based on the role hierarchy;

obtain authority permission grants/denials of the plurality of roles R1, R2 . . . Rm and authority permission grants/denials of the inheritance source roles of the plurality of roles R1, R2 . . . Rm based on the authority permission assignment; and derive, by inheritance, authority permission grants/denials of each of the plurality of roles R1, R2 . . . Rm.

5. An access control method, comprising:

a stage of executing, by a computer, a step of storing a subject assignment, an authority permission assignment, and a role hierarchy together or separately in one or more storage devices, the subject assignment associating one or more roles and a subject to which the one or more roles are assigned, the authority permission assignment associating a role, an authority permission, and a grant/denial which indicates whether a subject assigned the role is granted or denied the authority permission, the role hierarchy indicating an inheritance relation between roles;

a stage of executing, by the computer, a step of determining whether or not one subject is assigned a plurality of roles in the subject assignment and, when it is determined that one subject is assigned a plurality of roles, obtaining the plurality of roles, R1, R2 . . . Rm, where m is a natural number equal to or larger than 2;

a first authority permission grant/denial deriving stage of executing, by the computer, a step of deriving, by inheritance, authority permission grants/denials associated with each of the plurality of roles R1, R2 . . . Rm, based on the role hierarchy and the authority permission assignment;

a stage of executing, by the computer, a step of storing, among the authority permission grants/denials derived by inheritance, authority permissions A1, A2 . . . An, where n is a natural number, which are each derived from two or more different roles out of the plurality of roles R1, R2 . . . Rm and which are each granted to one of the plurality of roles R1, R2 . . . Rm but denied to another of the plurality of roles R1, R2 . . . Rm, in one of the one or more storage devices as authority permissions that are conflicting among a combination of the plurality of roles R1, R2 . . . Rm;

a stage of executing, by the computer, a step of receiving via an input device grants/denials of the authority permissions A1, A2 . . . An for the one subject assigned the combination of the plurality of roles R1, R2 . . . Rm;

a stage of executing, by the computer, a step of storing, based on the received grants/denials, grants/denials of the authority permissions A1, A2 . . . An with respect to the combination of the plurality of roles R1, R2 . . . Rm in one of the one or more storage devices as an exceptional authority permission assignment for an exceptional role, which is a virtual role constituted of the combination of the plurality or roles R1, R2 . . . Rm; and a second authority permission grant/denial deriving stage of executing, by the computer, a step of deriving, by inheritance, authority permission grants/denials associated with each of the plurality of roles R1, R2 . . . Rm of the exceptional role, based on the role hierarchy, the authority permission assignment, and the exceptional authority permission assignment;

wherein the second authority permission grant/denial deriving stage comprises:

a stage of executing, by the computer, a step of obtaining an inheritance source role of each of the plurality of roles R1, R2 . . . Rm, based on the role hierarchy;

a stage of executing, by the computer, a step of obtaining authority permission grants/denials of the plurality of roles, R1, R2 . . . Rm and authority permission grants/denials of the inheritance source roles of the plurality of roles, R1, R2 . . . Rm based on the authority permission assignment, and obtaining authority permission grants/denials of the exceptional role based on the exceptional authority permission assignment; and a stage of executing, by the computer, a step of deriving, by inheritance, authority permission grants/denials of the subject assigned the exceptional role, and wherein, when deriving, by inheritance, authority permission grants/denials of the subject assigned the exceptional role, the exceptional role is treated as a multiple-inheritance source role which has the plurality of roles R1, R2 . . . Rm as inheritance sources.

* * * * *

UNITED STATES PATENT AND TRADEMARK OFFICE
CERTIFICATE OF CORRECTION

| | |
|---|---|
| PATENT NO. | : 8,813,250 B2 |
| APPLICATION NO. | : 13/638539 |
| DATED | : August 19, 2014 |
| INVENTOR(S) | : Yoichiro Morita |

It is certified that error appears in the above-identified patent and that said Letters Patent is hereby corrected as shown below:

In the Specification

Column 6, Line 7: Delete ""H"" and insert -- "[]" --

Column 6, Line 8: Delete ""Q"." and insert -- "()". --

In the Claims

Column 25, Line 26: In Claim 2, delete "R2 Rm" and insert -- R2 ... Rm --

Signed and Sealed this
Seventeenth Day of February, 2015

Michelle K. Lee
*Deputy Director of the United States Patent and Trademark Office*